E. SIEBACHMEIER.
MECHANISM FOR STOPPING MOTOR VEHICLES.
APPLICATION FILED JUNE 21, 1919.

1,334,807.

Patented Mar. 23, 1920.
4 SHEETS—SHEET 1.

INVENTOR
Edward Siebachmeier
BY
*Alexander Ames*
ATTORNEY

E. SIEBACHMEIER.
MECHANISM FOR STOPPING MOTOR VEHICLES.
APPLICATION FILED JUNE 21, 1919.

1,334,807.

Patented Mar. 23, 1920.
4 SHEETS—SHEET 2.

INVENTOR
Edward Siebachmeier

BY
*[signature]*
ATTORNEY

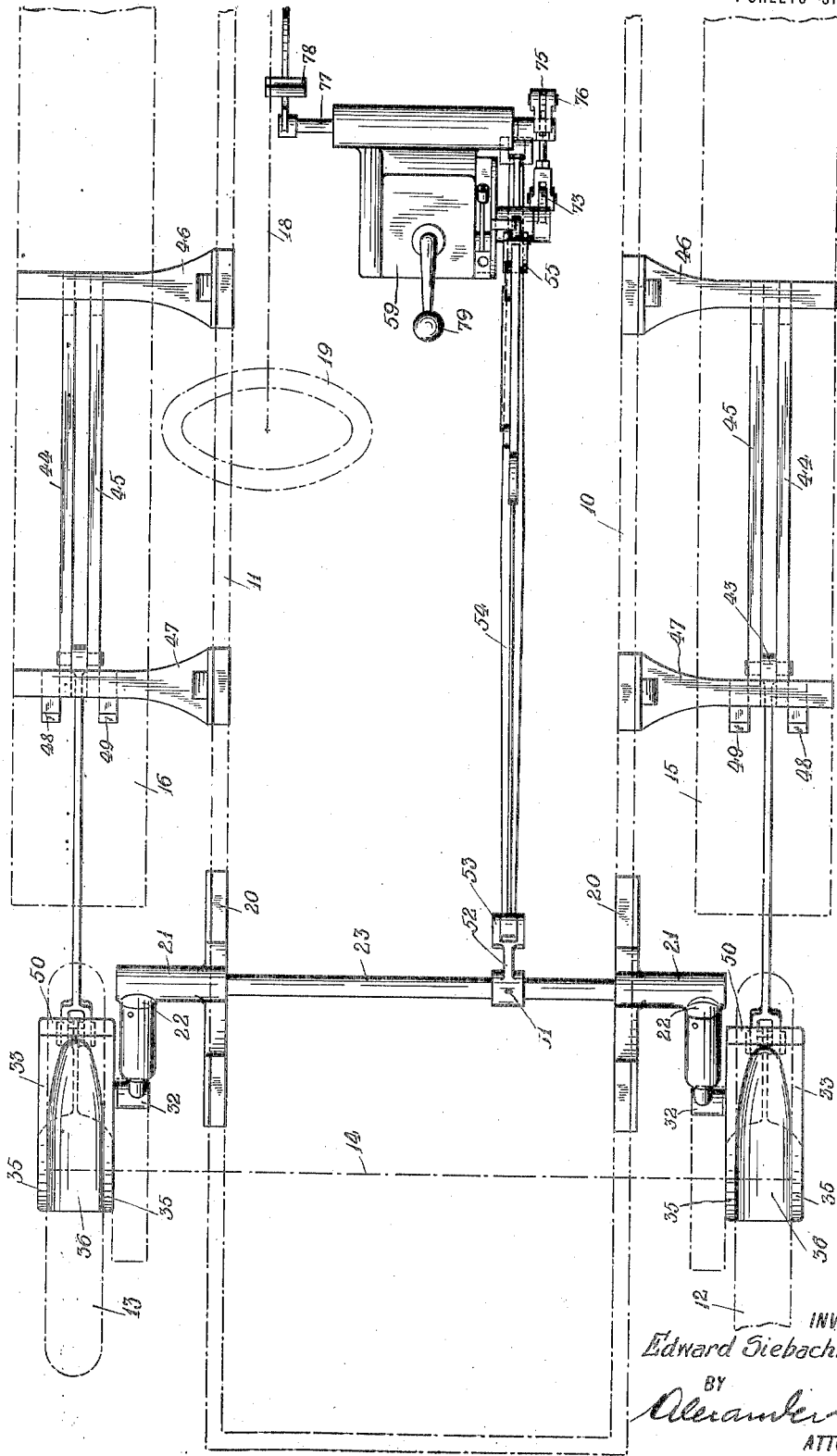

E. SIEBACHMEIER.
MECHANISM FOR STOPPING MOTOR VEHICLES.
APPLICATION FILED JUNE 21, 1919.
1,334,807.
Patented Mar. 23, 1920.
4 SHEETS—SHEET 4.
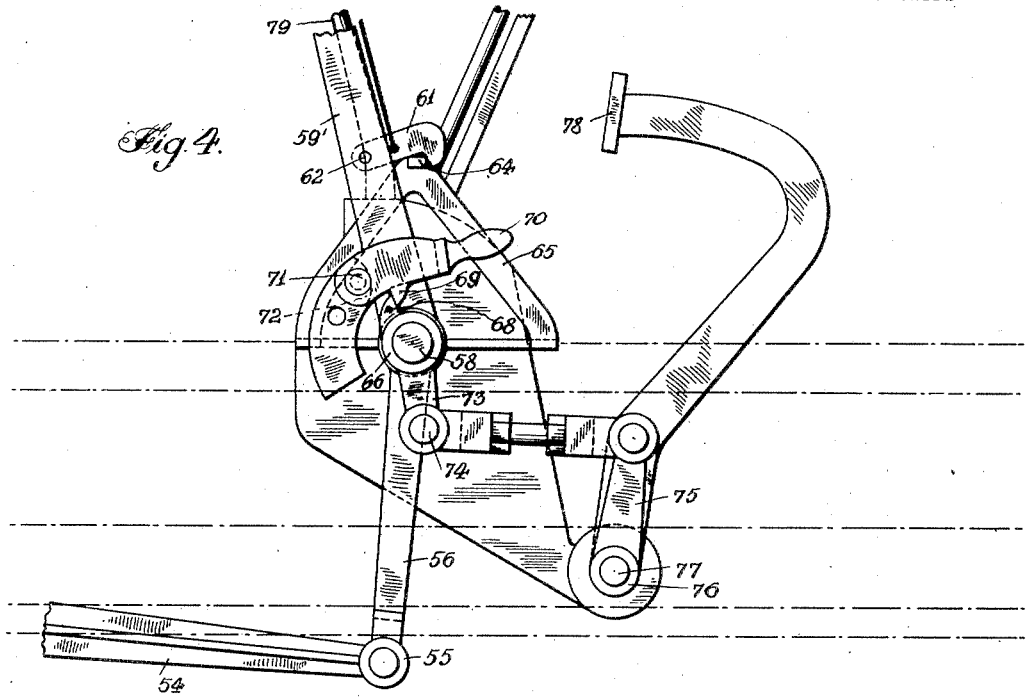
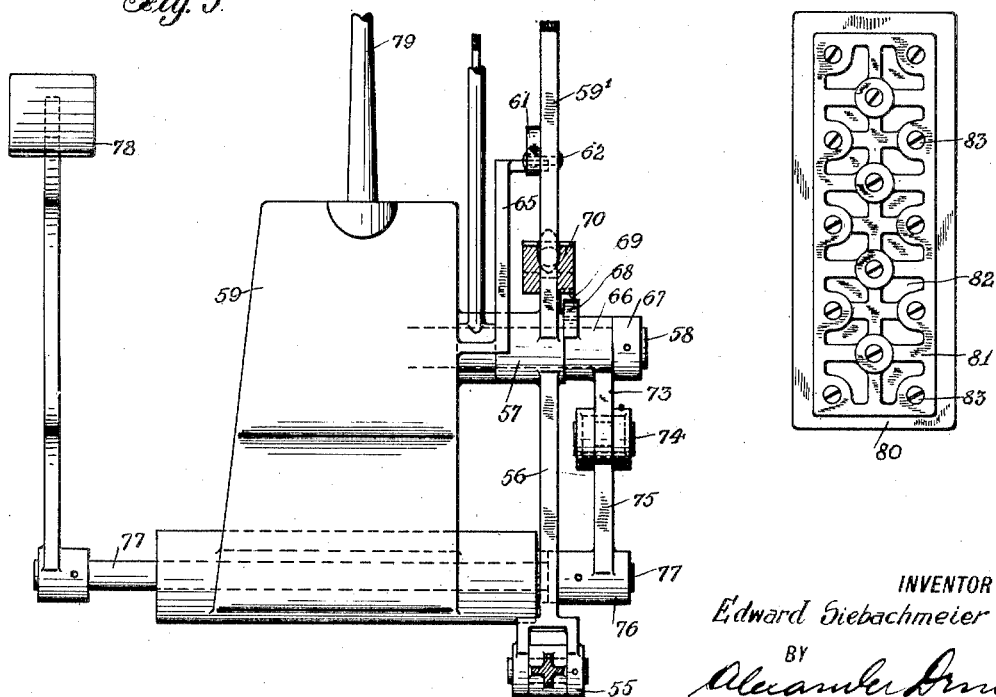
INVENTOR
Edward Siebachmeier
BY
Alexander Orne
ATTORNEY

UNITED STATES PATENT OFFICE.

EDWARD SIEBACHMEIER, OF WEST HOBOKEN, NEW JERSEY.

MECHANISM FOR STOPPING MOTOR-VEHICLES.

1,334,807.    Specification of Letters Patent.    Patented Mar. 23, 1920.

Application filed June 21, 1919. Serial No. 305,877.

*To all whom it may concern:*

Be it known that I, EDWARD SIEBACH-MEIER, a citizen of the United States, and resident of West Hoboken, in the county of Hudson and State of New Jersey, have invented new and useful Improvements in Mechanisms for Stopping Motor-Vehicles, of which the following is a specification.

My invention relates to improvements in mechanisms for stopping motor vehicles and it consists in the combinations, arrangements, and constructions herein described.

An object of my invention is to provide novel stopping shoes, designed to be carried by the vehicle and to be cast to the road in position for the vehicle driving wheels to run upon the same, so that the wheels, instead of revolving or skidding on the road, will be supported upon the shoes which are provided with means for gripping the road.

Another object of the invention is to provide operating mechanism by which the chauffeur, as he sits in his customary place by the steering wheel, may quickly effect either a service application or a release of the shoes; and further, to provide a novel connection between this mechanism and the clutch pedal whereby, when a service application is made, the clutch pedal will be automatically operated to unclutch the transmission, the arrangement of the connection being such that when the shoes are released or are in non-service position, the clutch pedal will be free to be operated in the usual way without producing an effect upon the shoe operating mechanism.

A further object is to provide a construction in which when a service application of the shoes is made and the clutch pedal is actuated to unclutch the transmission, the shoe operating mechanism may be locked to prevent the theft of the vehicle or its use by unauthorized parties.

Other objects and advantages will appear in the following specification and the novel features of the mechanism will be particularly pointed out in the appended claims.

One of the many possible embodiments of the invention is illustrated in the accompanying drawings forming a material part of this specification, and in which:—

Fig. 3 is a top plan view of the parts as illustrated in Fig. 1.

Fig. 4 shows in side elevation details of the shoe operating mechanism, and also its connection with the clutch pedal.

Fig. 5 is a rear view, partly in section, of the parts shown in Fig. 4.

Fig. 6 is an underneath plan view of a stopping shoe.

Figure 1:
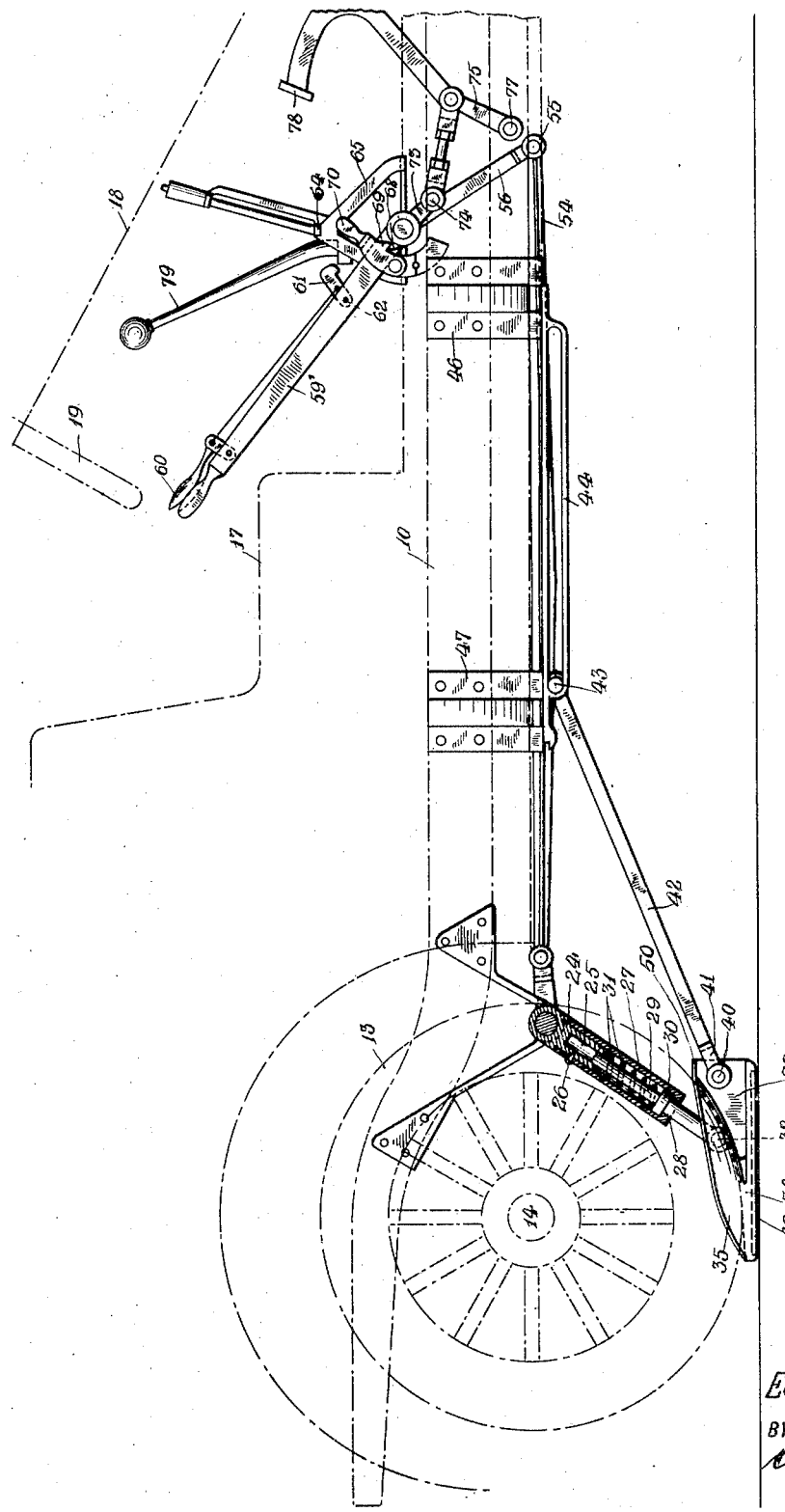
Figure 1 is a side elevational view with parts in section, of a stopping mechanism constructed in accordance with the present invention, including a fragment of an automobile shown in broken lines. In this view, the parts of the mechanism are shown in the relative positions they occupy when the stopping shoes are moved into service position.

For convenience of explanation and to avoid confusion of lines, I have presented an illustrative embodiment of my invention in connection with portions of an automobile, shown in broken lines. In referring to the parts of the automobile, let the numerals 10 and 11 designate the steel side sills of the framework; 12 and 13 the rear ground or driving wheels which are provided with the usual pneumatic tires; 14 the rear axle; 15 and 16 the foot boards; 17 the chauffeur's seat; and 18 the steering post with the usual steering wheel 19.

Bolted to and depending from each of the sills 10 and 11 is a hanger 20, in which is arranged for turning or rocking movement a cylindrical bearing device 21, formed at its outer end with a cylindrical portion 22 projecting at a right-angle. The bearing devices 21 are holed longitudinally to receive the ends of a rock shaft 23. The ends of the rock shaft are preferably formed to have anti-turning fit in the bearing devices, although they may be pinned or otherwise rigidly secured thereto, so that the bearing devices will be moved together in accordance with the rocking movements of the shaft.

Each projecting portion 22, as clearly illustrated in Fig. 1, is provided with a reduced part 24 having a central bore 25. Mounted on the reduced part 24 and secured thereto by set screws 26 or otherwise, is a cylindrical casing 27 having an opening 28 in its bottom. Working in the bore 25 and through the opening 28 is a pin or plunger 29 formed with a collar 30 in position to limit its outward movement. Mounted around the plunger is a push spring 31, which, being engaged between the end of 24 and the collar, normally urges the plunger outwardly, but permits it to yield inwardly. To the outer end of each plunger 29, there is rigidly secured at right-angles a pin 32 on which is pivotally engaged at its inner side and about midway its length a longitudinal stopping shoe 33.

Each shoe, preferably made of pressed steel or aluminum, is formed with a flat base 34, and with sides 35, which, in the interior, merge so as to produce a bottom 36 of concave form both longitudinally and transversely, adapted to receive a sufficient segment of the driving wheel tire to enable the driving wheel to be supported entirely on the shoe. The forward portion of the bottom, where it curves upwardly from the base, is supported on or merges into a web 37, which rises centrally from the base. Straddling this web and pivotally secured thereto at 40 is the yoked end 41 of a bracing and guiding bar 42, the forward end of which is enlarged and equipped with a transverse pin 43 which works in the slotted guide rails, the enlarged end coming between said guide rails as best seen in Fig. 3. These guide rails are riveted in parallel relation to the underside of the foot board supporting brackets 46 and 47, which are made especially strong and are rigidly secured to the adjacent sill as shown to prevent the guide rails from getting out of line. At their rear ends the guide rails 44 and 45 are formed with projecting hooks 48 and 49, adapted to engage on either side of the web 37 under a ledge 50 formed thereon.

Figure 2:
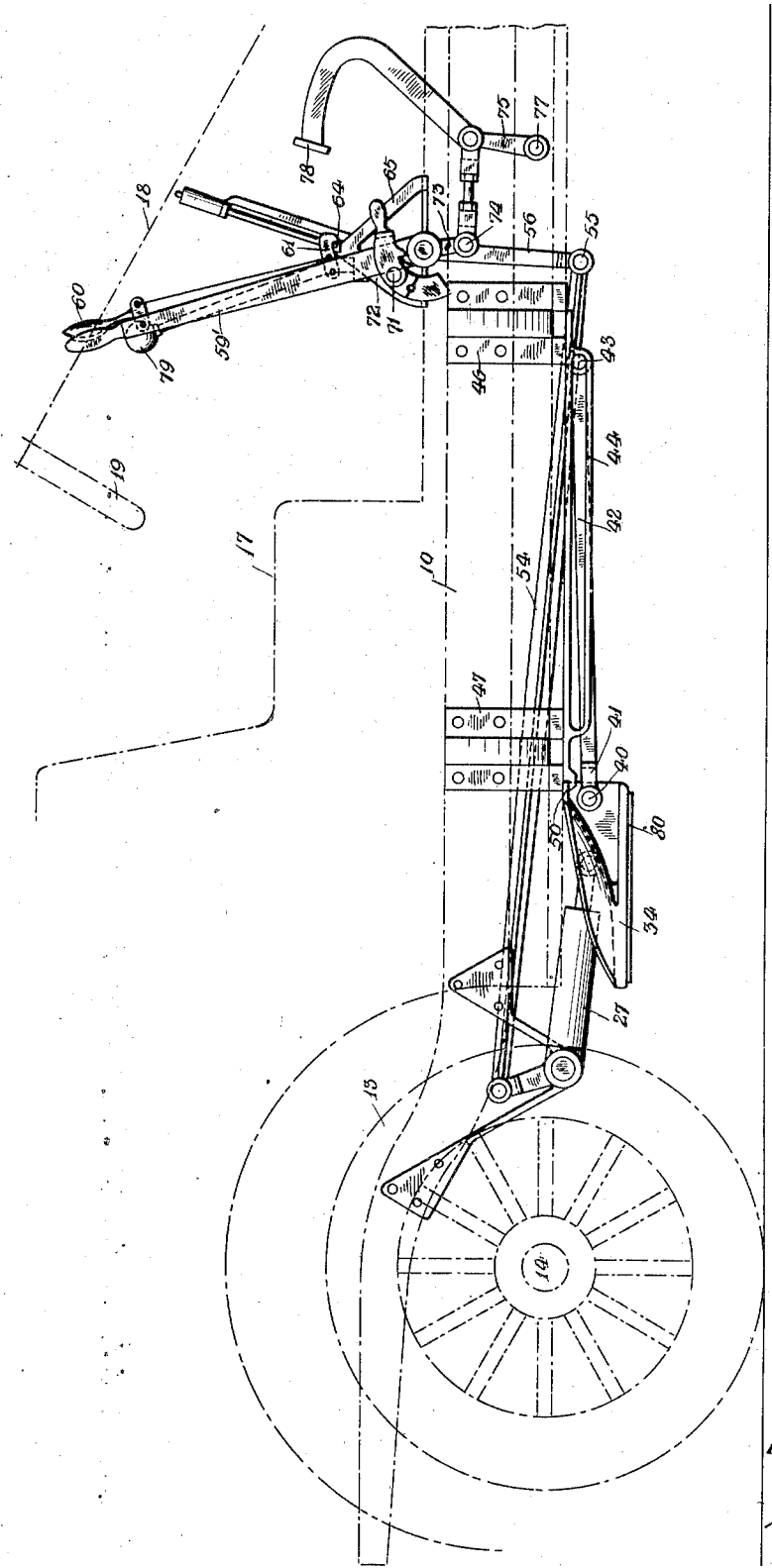
Fig. 2 is a similar view, but showing the relative positions of the parts when the shoes are in non-service position.

The parts above described are so arranged and proportioned that when the shaft 23 is turned in one direction, the shoes 33 will be drawn upwardly and forwardly engaging the ledges 50 upon the hooks as shown in Fig. 2; and when it is turned in the opposite direction the same will be cast to the road immediately in front of the driving wheels so that the driving wheels will engage and run onto the same as shown in Figs. 1 and 2. The spring and plunger devices p means for maintaining the ledges in engagement with the hooks when the shoes are elevated; and they also serve as means for automatically adjusting the shoes to tires differing in size or in degrees of inflation.

For imparting movement to the shaft 23, I pin thereto at 51 a crank 52 having a yoke 53 with which is pivotally engaged a connecting rod 54, the forward end of which is pivotally engaged with the yoked end 55 of the arm 56 projecting from a hub 57, loose upon a stud 58, herein shown as projecting from the gear casing 59, but which may be secured to any suitable rigid parts of the automobile. Extending upwardly from the hub, in angular relation with respect to the arm 56, is an operating lever 59', with which is associated a coöperating handle 60, adapted in an obvious manner to actuate a dog 61, pivoted to the operating lever at 62. This dog may be engaged with a keeper 64, secured to a triangular shaped bracket 65, which may be supported for instance upon the gear casing. By moving the operating lever into position for engaging the dog with its keeper (Fig. 2) the shoes 33 will be elevated and engaged with their hooks. On the other hand, by lowering this lever (Fig. 1), the shoes will be moved into position for supporting the driving wheels. Adjacent the hub 57, there is loosely mounted on the stud 58 a second hub 66, held in operative position by a collar 67 pinned to said stud. Projecting from the hub 66 is a tooth 68, adapted to coöperate with a tooth 69 formed on the curved hand lever, which is pivoted at 71 to an enlargement 72 cast with the operating lever 59. Projecting downwardly from the hub 66 is an arm 73 having pivotal connection with an adjustable link 74, pivotally engaged with an arm 75 rising from a hub 76, fast on a shaft 77, to which the shank of the clutch pedal 78 is attached and with which the clutch pedal may turn as on a fulcrum to effect the clutching or unclutching of the transmission (not shown).

Now the curved hand lever 70, is pivoted to the operating lever 59 in such position that when the operating lever is put in elevated position for the engagement of the dog with its keeper, the clutch pedal can be moved freely, since upon the depression of the clutch pedal, the hub 66 will be turned so as to carry the tooth 68 away from the tooth 69. When the operating lever 59 is lowered, the curved lever 70, moving concentrically about the hub 66 so as to hold the tooth 69 in engagement with the tooth 68, will force the depression of the clutch pedal. By lowering the operating lever, therefore, the clutch pedal may be depressed to effect the unclutching of the transmission at the same time a service application of the shoes is made. Should it be desired to make a service application of the shoes without affecting the transmission, the curved lever 70 should be released from the tooth 68, before the operating lever is lowered.

To remove the shoes from underneath the driving wheels, it is necessary to reverse the automobile. In order to accomplish this, the clutch pedal should be depressed sufficiently to enable the release of the curved lever 70 from the tooth 68, after which the speed lever 79 is put in reverse to run the driving wheels off the shoes in an obvious manner. Then the operating lever is elevated to raise the shoes and engage them with their hooks as hereinbefore described.

Adverting to the construction of the shoes, it will be observed in Figs. 1 and 6 that the base 34 is preferably provided all around with a downwardly projecting flange or rim 80 so as to leave a cavity in which may be seated a rubber block or plate 81 having any suitable projecting configurations as 82, adapted to grip or take hold of the road. So that it may be readily replaced when impaired through wear, the rubber block is removably secured to the base by screws as 83 or other suitable means.

Having thus described my invention, what I claim is:—

1. In a motor vehicle having a driving wheel, a stopping shoe adapted to take hold of the road and to receive and support said shoe, a rock shaft having a crank and having also means to attach and suspend the shoe in position to be brought into and out of engagement with the driving wheel at the point of its engagement with the road, means for guiding said shoe, an axis and an operating lever movable thereon into "on" or "off" position, a connection between said operating lever and the rock shaft crank whereby to swing said shoe into or out of engagement with the wheel accordingly as said lever is moved into "on" or "off" position, a curved lever pivoted to said operating lever and provided with a tooth, a hub device loose on said axis and provided with a tooth and an arm, a clutch pedal and a shaft rockable therewith, linkage connection between said hub arm and said clutch pedal shaft through which the hub may be actuated freely by the clutch pedal when the operating lever is in "off" position, said operating lever through the engagement of the curved lever tooth with the hub tooth serving as means, when moved into "on" position, for automatically actuating said clutch pedal.

2. In a motor vehicle, the combination with a driving wheel and a clutch pedal controlling the clutching and unclutching of the transmission, of a stopping shoe adapted to take hold of the road and to receive and support the driving wheel, a rock shaft having a crank and having also means to attach and suspend the shoe in position to be brought into and out of engagement with the wheel at the point of its engagement with the road, an axis, an operating lever movable thereon into "on" or "off" position, a connection between said lever and said crank by which to swing said shoe into or out of engagement with the driving wheel accordingly as said operating lever is moved into "on" or "off" position, a curved lever pivoted to the operating lever and provided with a tooth, a hub on said axis and provided with a tooth, linkage connection between said hub and said clutch pedal whereby movement of either one will effect the actuation of the other, the said hub being freely movable when the operating lever is in "off" position, said operating lever when moved into "on" position serving as the means through the engagement of said curved lever tooth with the hub tooth for automatically actuating the clutch pedal.

3. In a motor vehicle, the combination with an operating lever movable on a shaft into "on" or "off" position and a clutch pedal movable with a shaft into "on" or "off" position, of a curved lever pivoted to said operating lever and provided with a tooth, a hub mounted on said operating lever shaft and provided with a tooth and an arm, linkage connection between the hub arm and the clutch pedal shaft whereby either the hub or the clutch pedal may be actuated upon the movement of the other, said hub, when the operating lever is in "off" position, being movable to allow the clutch pedal to be moved freely into "on" or "off" position, the said operating lever when moved into "on" position serving as the means through the engagement of the curved lever tooth with the hub tooth for automatically effecting the movement of the clutch pedal into "off" position.

In testimony whereof I have signed my name to this specification.

EDWARD SIEBACHMEIER.